(12) United States Patent
Parmer

(10) Patent No.: US 7,017,975 B2
(45) Date of Patent: Mar. 28, 2006

(54) EQUIPMENT-HAULING EXPANDABLE SHELTER

(76) Inventor: James D. Parmer, 4308 E. Rockledge Rd., Phoenix, AZ (US) 85044

( * ) Notice: Subject to any disclaimer, the term of this patent is extended or adjusted under 35 U.S.C. 154(b) by 32 days.

(21) Appl. No.: 10/827,937

(22) Filed: Apr. 19, 2004

(65) Prior Publication Data
US 2004/0262948 A1 Dec. 30, 2004

Related U.S. Application Data

(63) Continuation-in-part of application No. 10/315,829, filed on Dec. 9, 2002, now Pat. No. 6,722,726.

(51) Int. Cl.
B60P 3/363 (2006.01)
B60P 3/34 (2006.01)

(52) U.S. Cl. .................. 296/157; 296/158; 296/168; 296/173; 296/26.02

(58) Field of Classification Search .......... 296/26.02, 296/26.03, 26.08, 26.11, 26.12, 26.15, 156, 296/157, 158, 159, 160, 168, 169, 172, 173, 296/176
See application file for complete search history.

(56) References Cited

U.S. PATENT DOCUMENTS

| | | | |
|---|---|---|---|
| 1,422,498 A | 7/1922 | Vint | |
| 1,437,172 A | 11/1922 | Curtiss | |
| 1,461,574 A | 7/1923 | Caplan | |
| 1,476,051 A | 12/1923 | Cassell | |
| 1,501,790 A | 7/1924 | McClay et al. | |
| 1,568,895 A | 1/1926 | Lyons | |
| 1,596,924 A * | 8/1926 | Curtis | 296/173 |
| 1,750,128 A | 3/1930 | Romine | |
| 1,826,480 A | 10/1931 | Rappich | |
| 1,857,081 A | 5/1932 | Fontaine | |
| 1,964,894 A | 7/1934 | Rohne | |
| 2,155,582 A | 4/1939 | Bond | |
| 2,167,557 A | 7/1939 | Stout | |
| 2,541,288 A | 2/1951 | Rice | |
| 2,543,349 A | 2/1951 | Britton | |
| 2,676,839 A | 4/1954 | Lacoste | |
| 2,847,136 A | 8/1958 | Neff | |
| 2,912,274 A | 11/1959 | Falkner | |
| 3,053,563 A * | 9/1962 | Green | 296/173 |
| 3,070,850 A * | 1/1963 | McClure, Sr. | 52/69 |
| 3,116,949 A | 1/1964 | Muse | |
| 3,144,150 A | 8/1964 | Cox | |
| 3,179,462 A | 4/1965 | Hagen | |
| 3,193,321 A | 7/1965 | Rose | |
| 3,397,006 A | 8/1968 | Grant | |
| 3,448,875 A | 6/1969 | Robinson | |

(Continued)

Primary Examiner—Patricia L. Engle
(74) Attorney, Agent, or Firm—Booth Udall, PLC

(57) ABSTRACT

A versatile equipment-hauling expandable shelter is disclosed configured to both provide shelter and store, transport, and launch equipment, such as motorized toys, military equipment, tools, and the like. The equipment-hauling expandable shelter includes a chassis and a shelter attached to the chassis, such as one of a tent, a container, and a cover. The shelter is configured to be stowed on the chassis at a small exterior profile size with a maximum equipment/storage volume and erected on or around the chassis into a spacious shelter with more than double the volume of the equipment/storage volume. The center roof section rises automatically by lift assemblies to provide adequate head room for standing. Drop assemblies allow for solid/sealed wheel fenders and solid inner side panel extensions which in turn provide for a continuous floor and ramps. Portable interior components provide changeable/versatile interior configurations.

17 Claims, 14 Drawing Sheets

U.S. PATENT DOCUMENTS

| | | |
|---|---|---|
| 3,784,248 A | 1/1974 | Neuman |
| 3,845,980 A | 11/1974 | Grabast |
| 3,902,613 A | 9/1975 | Newland |
| 3,909,057 A * | 9/1975 | Guthry .................. 296/157 |
| 3,961,716 A | 6/1976 | Renaud |
| 4,060,036 A | 11/1977 | Palms |
| 4,072,337 A | 2/1978 | Barker |
| D249,667 S | 9/1978 | Thompson |
| 4,854,631 A | 8/1989 | Laursen |
| 4,869,545 A | 9/1989 | Notermann |
| 5,314,200 A | 5/1994 | Phillips |
| 6,017,080 A | 1/2000 | Gill |
| 6,135,532 A | 10/2000 | Martin |
| 6,164,882 A | 12/2000 | Selle |
| 6,170,502 B1 | 1/2001 | Pullen |
| 6,283,536 B1 | 9/2001 | Muzyka et al. |
| 6,402,446 B1 | 6/2002 | Nadherny et al. |
| 6,481,941 B1 | 11/2002 | Nadherny et al. |
| 6,712,414 B1 * | 3/2004 | Morrow .................. 296/26.01 |

* cited by examiner

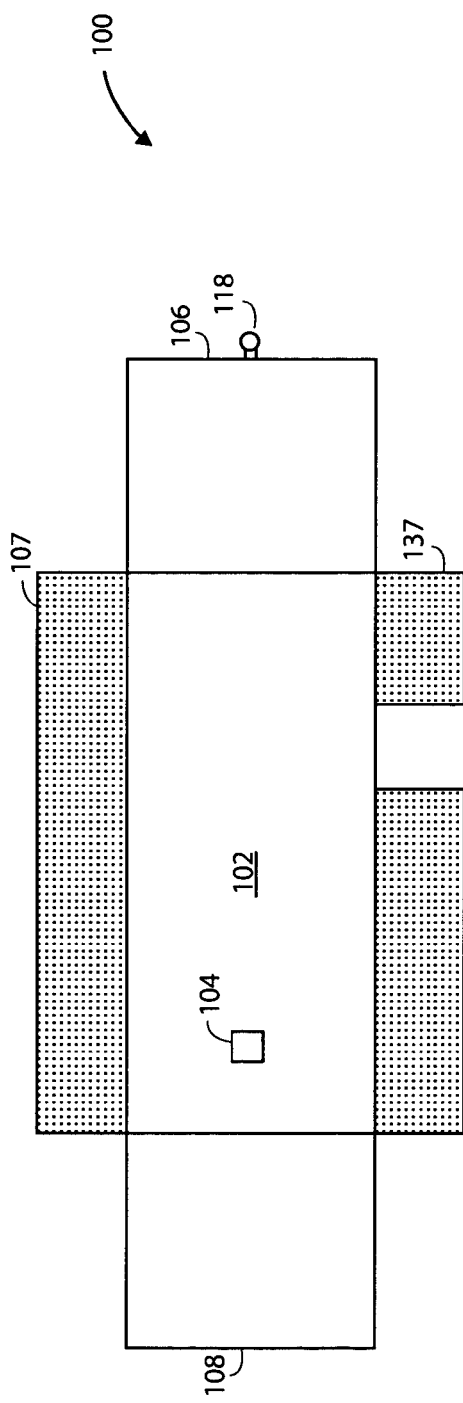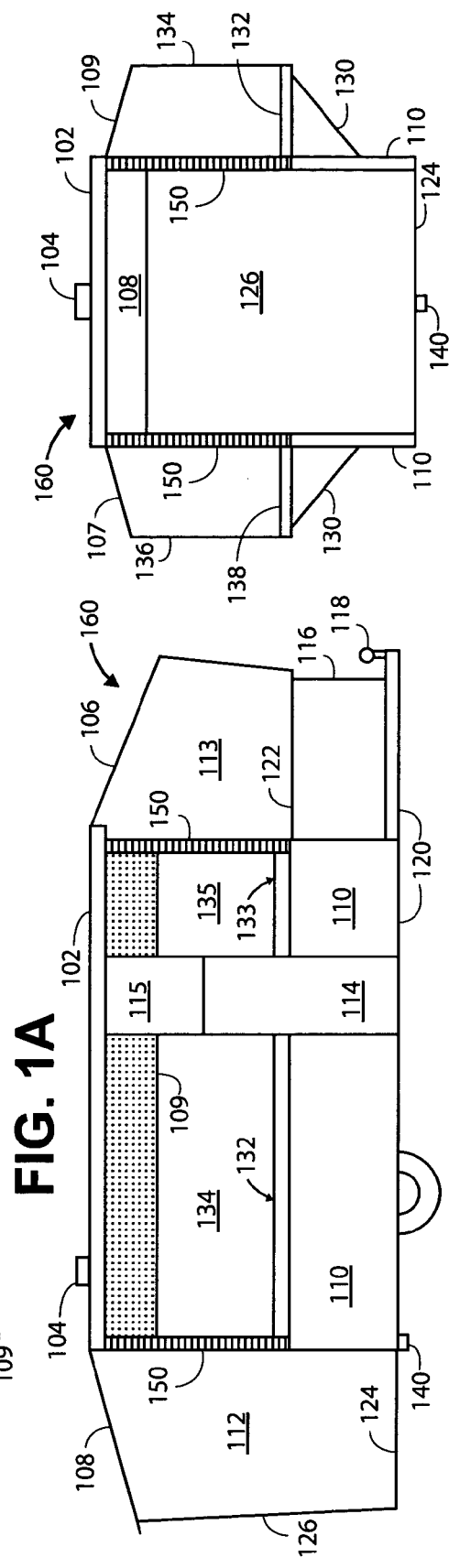

EQUIPMENT-HAULING EXPANDABLE SHELTER

CROSS REFERENCE TO RELATED APPLICATION

This application is a continuation-in-part of the earlier U.S. Utility Patent Application to Jim Parmer entitled "TOY-HAULING TENT TRAILER," Ser. No. 10/315,829, filed Dec. 9, 2002, now U.S. Pat. No. 6,722,726, the disclosure of which is hereby incorporated entirely herein by reference.

BACKGROUND OF THE INVENTION

1. Technical Field

This invention generally relates to an equipment-hauling expandable shelter.

2. Background Art

Many areas suitable for riding motorized toys are remote, unimproved areas. The problem of transporting toys and/or other equipment to the remote area and the problem of lodging at the remote area arise simultaneously. Conventional "toy haulers" exist, which are nothing more than travel trailers with hard sides, a hard ceiling, and a floor area allocated for toys. One disadvantage of these conventional toy haulers is their large size which, because of their height, often violate zoning laws regarding storage in many neighborhoods and which often limit access to remote and unimproved areas. Another disadvantage of these conventional toy haulers is their high cost. Yet another disadvantage of these conventional toy haulers is their weight, which typically requires a large, expensive pickup truck to pull the toy hauler, especially in mountainous terrain. Still another disadvantage of these conventional toy haulers is their lack of shelter (e.g., sleeping capabilities).

Accordingly, what is needed is a recreational camper (e.g., camper hauled in a pick-up) and/or a recreational trailer (e.g., camping trailer hauled behind a vehicle) that may haul equipment (e.g. toys) and be slept in, yet that is light weight, low in cost, and at a size that is compatible with zoning laws and narrow, unimproved roads.

DISCLOSURE OF THE INVENTION

The present invention may be readily adapted to a variety of versatile equipment-hauling expandable shelters for both hauling equipment and providing shelter, thereby accommodating consumers who have desires to haul recreational toys while having sleeping capabilities for example. Equipment-hauling expandable shelters may be configured to store, haul, and launch equipment, such as cargo, tools, toys, and the like. As used herein, "toys" refer to motorized toys such as personal watercraft (e.g., jet skis), dirt bikes, snow mobiles, dune buggies, sand rails, all-terrain vehicles, quad runners, and the like. Equipment-hauling expandable shelters may comprise a chassis and a shelter attached to the chassis, such as one of a tent, a container, and a cover, wherein the shelter has an interior equipment space in both the stowed and erected positions of the shelter.

As an alternative to the conventional, large toy hauling RVs that require storage property and large towing vehicles, embodiments of the invention may include one or more of the following. Equipment-hauling expandable shelters meet homeowner association storage requirements and may be folded closed to have a height under six or seven feet for launching, transporting and storing toys. However, even though equipment-hauling expandable shelters may close down to a small exterior profile size, they may retain a maximum equipment/storage volume (e.g., sized for most motorized toys) and may open about 2.7 times or more the equipment/storage volume into a spacious shelter volume. In erecting the shelter, the shelter may unfold by: pivoting outer side and end panel extensions upward to form additional roof sections in up to four directions; and pivoting inner side and end panel extensions downward to form additional floor space. One or more inner side and end panel extensions may pivot further to serve as a ramp or ramps for loading and launching toys. The shelter walls in the unfolded open position may be at least partially tent walls, which may have doors and windows. A roof extension, an associated floor extension, and tent material extending between them may be prefabricated as modular folding wall units, optionally with extendable frames. The center section of roof may rise to provide adequate head room for standing. With the addition of lift assemblies, such rising of the center section of the roof may occur automatically and simultaneously with the pivoting of outer side and/or end panels upward. With the addition of drop assemblies, solid/sealed wheel fenders and solid inner side panel extensions may be provided for a continuous floor and ramps, while still providing for corner jacks (e.g. the lift/stabilization system of a trailer) for example to lift a wheel off the ground and clear of the fender to be removed and changed. The floor may have integral tie-down strips that also serve as flooring supports or joists. In both the folded and unfolded state, the interior space may be vented and drained to the outside. The interior space may contain one or more partitions separating equipment-hauling space from a clean space. The toy-hauling tent trailer may be used with the roof raised and the sides remaining stowed for carrying taller equipment in a covered fashion. Equipment-hauling expandable shelters may be hauled in or behind almost every vehicle on the road (e.g., cars, SUV's, and pickup trucks). Equipment-hauling expandable shelters may have changeable/versatile interior configurations (sleeping, cooking/eating, entertaining, and the like) to suit the consumer's tastes because of portable interior components (beds, storage units, kitchen/galley, shower/potty, furniture (e.g., chairs, tables, love seats), heaters, TVs, stereos, DVD players, VCRs, and the like).

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings, where like designations denote like elements.

FIGS. 1A–C are top, side, and rear views respectively of an embodiment of equipment-hauling expandable shelter in the erected position of the shelter.

DESCRIPTION OF THE INVENTION

As discussed above, embodiments of the present invention relate to an equipment-hauling expandable shelter. Generally, the equipment-hauling expandable shelter may include a chassis and a shelter attached to the chassis, such as one of a tent, a container, and a cover. The shelter may be configured to be stowed on the chassis at a small exterior profile size with a maximum equipment/storage volume and erected on and/or around the chassis into a spacious shelter with more than double the volume of the equipment/storage volume. The center roof section may rise automatically by lift assemblies to provide adequate head room for standing. Drop assemblies may allow for solid/sealed wheel fenders and solid inner side panel extensions which in turn provide for a continuous floor and ramps. Changeable/versatile interior configurations may be provided by portable interior components.

Figures 4A, 4B:
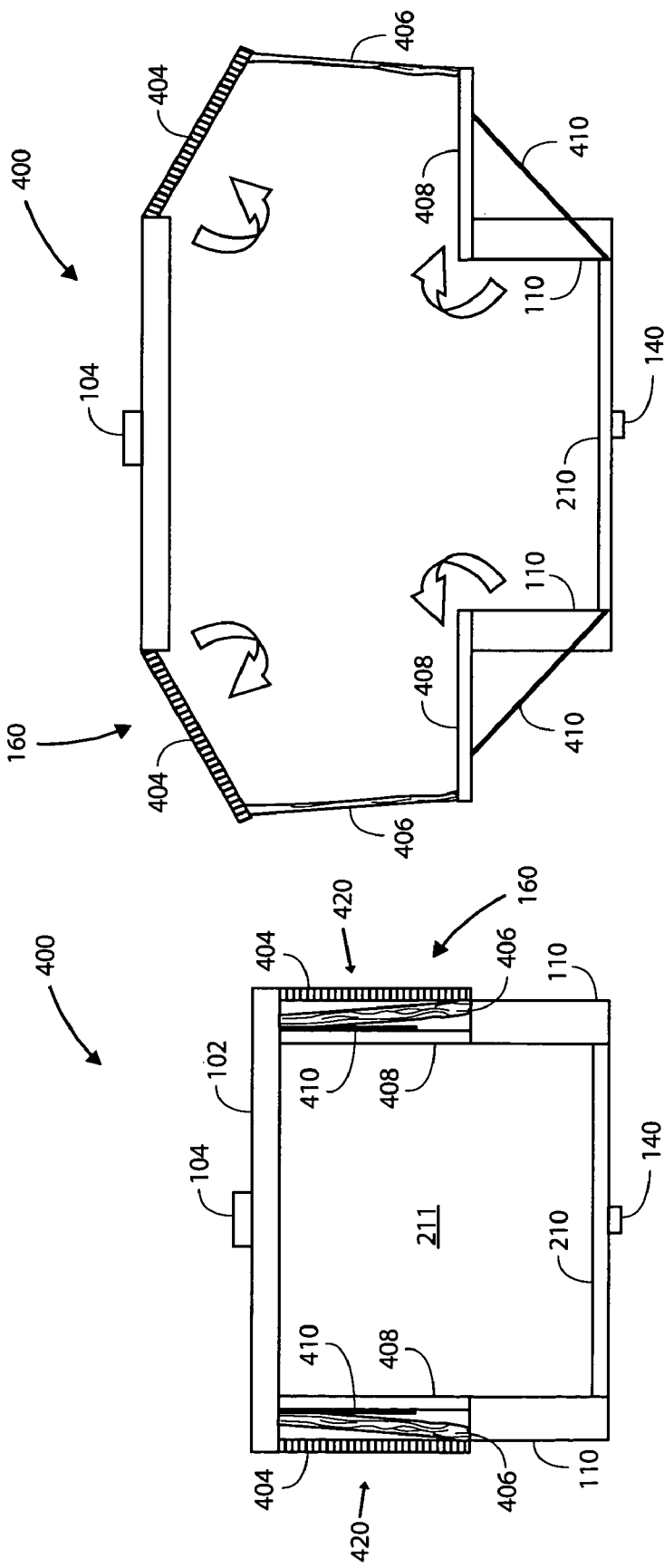
FIG. 4A is a cross-sectional view through the toy space of still another embodiment of an equipment-hauling expandable shelter in the stowed position of the shelter.
FIG. 4B is a cross-sectional view through the toy space of the equipment-hauling expandable shelter of FIG. 4A in the erected position of the shelter.

Accordingly, although the invention may be readily adapted to a variety of embodiments of an equipment-hauling expandable shelter, with reference to FIGS. 1A–2C, toy-hauling tent trailer 100 is an example of an equipment-hauling expandable shelter of the invention. FIG. 1A is a top view of toy-hauling tent trailer 100 in an erected position of tent 160. Center roof section 102 may be a rigid web supported by extendable posts 150 (FIG. 1B). In some embodiments, center roof section 102 may be flexible tent material, such as canvas, nylon, cotton duck, or polyethylene, on a frame. The flexible tent material may be of different inner and outer layers, as is known in the art of tent making. Vent 104 in center roof section 102 may reduce the build up of fuel fumes in toy space 211 (FIG. 4A). In some embodiments, center roof section 102 may be made of several panels of different materials. For example, a translucent panel may be included as a skylight. Center roof section 102 is the top of toy-hauling tent trailer 100 in the stowed position of tent 160.

Front roof extension 106 may be flexibly connected to center roof section 102. For example, a piano hinge may be used, with a flexible waterproof fabric covering to prevent rain from leaking inside the tent. In some embodiments, the connection may be made on the underside of center roof section 102, an inch or so inward from the edge, to give some rain protection without the need for a flexible waterproof fabric covering. Front roof extension 106 may be maintained in its erected position by any conventional erecting gear. For example, the latches used for extending and locking table leaves may be used. Braces will also serve the purpose. For further example, slotted braces secured with wing nuts on anchored bolts through the slots may allow the user to vary the slope of the front roof extension 106. In other embodiments, hydraulic or pneumatic struts may be used for braces.

Front roof extension 106 may be a single panel or web. In some embodiments, front roof extension 106 may itself be a series of articulated panels that may unfold to cover a larger area. Such panels may be folded up, accordion-style, in the stowed position of the tent 160. The length of front roof extension 106 for stowing, whether a single piece or not, is limited by the height of toy-hauling tent trailer 100. Front roof extension 106 is the forward face of toy-hauling tent trailer 100 in the stowed position. Accordingly, the length of stowed front roof extension 106 may cover no greater distance than from the top of toy-hauling tent trailer 100 to trailer chassis 120. Front roof extension 106 may have edges not connected to center roof section 102. Front roof extension 106 may engage tent wall 113 along those non-connected edges.

Rear roof extension 108 may be configured the same as front roof extension 106 as to the sizing, erecting gear, tent material attachment, embodiments having accordion-style extendable panels, and the like. In a particular embodiment, rear roof extension 108 may have a license plate holder, brake lights, and running lights on its outside surface.

Side roof extension 107 and side roof extension 109 may each also be configured the same as front roof extension 106 as to the sizing, erecting gear, tent material attachment, embodiments having accordion-style extendable panels, and the like. The length of side roof extension 109 may be less than the length of trailer chassis 120 to accommodate door 114 (FIG. 1B). Second side roof extension 137, similar to side roof extensions 107 and 109, may be used on the same side of toy-hauling tent trailer 100 but on the other side of door 114.

FIG. 1B shows a side elevation view of toy-hauling tent trailer 100 in the erected position. Trailer chassis 120 may have trailer hitch 118, wheels, and a frame which may define the bottom perimeter of toy-hauling tent trailer 100 and floors 210 and 212 (FIG. 2A) therein. Lower sidewalls 110 may be rigidly attached to chassis 120 and may include a front lower sidewall as well. Side roof extension panels 107, 109, and 137 need not be as long as rear roof extension 108 in embodiments 100 with lower side walls 110 because side roof extension panels 107, 109, and 137 need only be long enough to reach the tops of lower side walls 110 in the stowed position (FIG. 2B). In other embodiments, side roof extension panels 107, 109, and 137 may overlap lower sidewalls 110. In some variations of such embodiments, side roof extension panels 107, 109, and 137 may overlap lower sidewalls 110 all the way to the bottom edge of trailer chassis 120.

Door 114 may be sized to be operable in the stowed position of tent 160 (FIG. 2B). In the erected position of tent 160, door extension 115 completes the closure of the door opening. Door extension 115 may be flexibly connected to door 114. In other embodiments, door extension 115 may slide, or telescope, down into a hollow door 114, or may be detachable to be stowed. In a variation of a telescoping door extension 115, door extension 115 and a door frame may be attached to center roof section 102 and may telescope together as tent 160 is erected or stowed. Side roof extension panels 109 and 137 may provide a gap above door 114, as shown. This permits operating door 114 in the stowed position of tent 160 because side roof extension panel 109 does not fold over door 114. In a particular embodiment, where use of door 114 is not desired in the stowed position, side roof extension 109 may extend to the front end of toy-hauling tent trailer 100, thereby providing a roof over door 115. In yet another embodiment, side roof extension panel 109 may have its own articulated end roof extension which may be stowed without extending the length of side roof extension panel 109, but which may be erected to extend over the doorway. In some embodiments, door 114 may be located on the front, rear, or other side of toy-hauling tent trailer 100. In some other embodiments, door 114 may be located elsewhere on the side of toy-hauling tent trailer 100. In a particular embodiment, there may be no door 114.

In a particular embodiment, door 114 and door extension 115 may be made of tent fabric and connected by a zipper to allow use of just door 114 in the stowed position. In another particular embodiment, wherein tent walls 134–135 extend down to chassis 120, door 114 may be in tent walls 134–135, and not usable in the stowed position.

Center roof section 102 may be supported by extendable posts 150. Posts 150 may be extended by telescoping and locking with a transverse pin or similarly effective lock at each telescoping joint. In a variation of telescoping post 150, posts 150 may be pneumatically extended and retracted. In various alternate embodiments, the supports for center roof section 102 may be one or more scissor jacks, may be posts that are extended by adding additional sections using interlocking tapered joints, or may be posts extended by folding out and locking articulated sections. Embodiment 100 uses four corner posts 150, but other arrangements will occur to those skilled in the art of tent-making. For example, in a particular embodiment, the center roof section 102 may be supported by external bowed crossing struts.

Figure 2B:
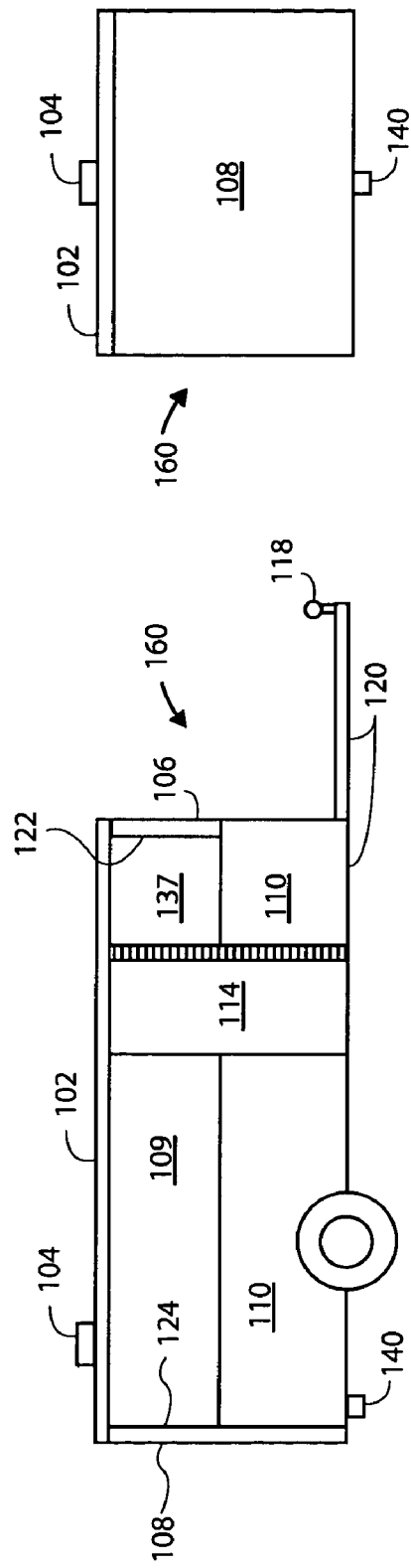
FIG. 2B is a side view of the equipment-hauling expandable shelter of FIGS. 1A–C in the stowed position of the shelter.
Figure 3:
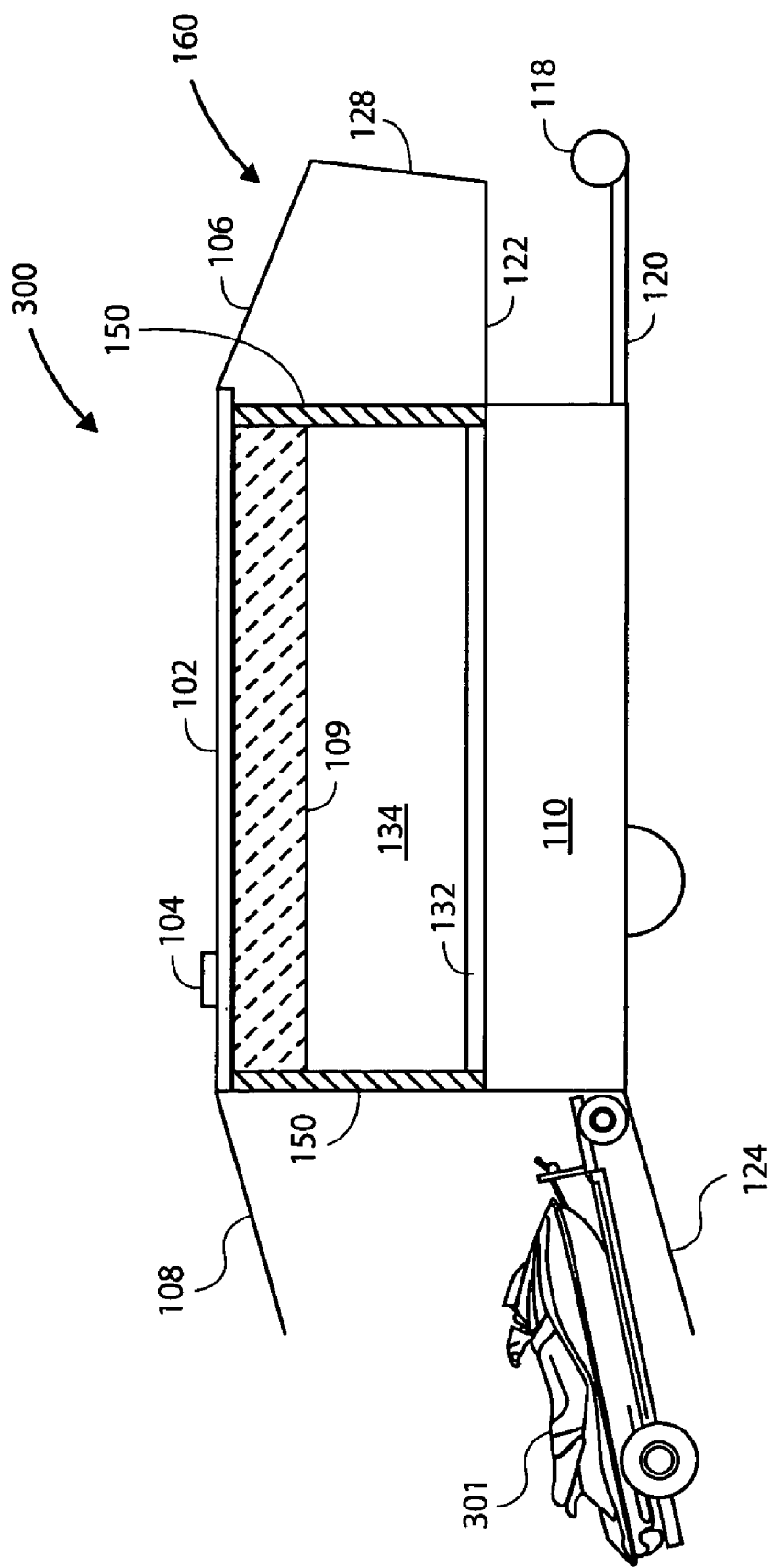
FIG. 3 is a side view of an exemplary toy being loaded into another embodiment of an equipment-hauling expandable shelter in the erected position of the shelter.

Tent walls 126 and 112 depend from previously described roof extension 108 to engage rear floor extension 124. Floor extension 124 folds out from the stowed position (FIG. 2B) on flexible connections, such as hinges, in a manner similar to erecting roof extensions 106–109 and 137, but is folded downward from vertical positions. Floor extension 124 may be detached from tent walls 126 and 112 and further lowered to serve as a loading and launching ramp for toys (FIG. 3). Tent wall 126 may be equipped with a vertical zipper to allow wall 126 to be opened for loading and launching toys. In some alternate embodiments, ramp 124 and opening wall 126 may be on a side of toy-hauling tent trailer 100. Rear floor extension 124 may have a high traction surface on the top side thereof (FIG. 3). In a particular embodiment, rear floor extension 124 may be a metal grating having an opening sufficient to let mud, snow, and debris fall through. In an embodiment, rear floor extension 124 may comprise one or more tie-down strips. In even another embodiment, floor extensions 124, 122, 138, and 132 may be supported by cables depending from posts 150.

Tent wall 134 depends from side roof extension 109 to engage side floor extension 132. Tent wall 134 extends around the ends of side roof extension 109 to enclose the exterior perimeter of the extended space between side floor extension 132 and side roof extension 109. Tent wall 135 is similarly configured between side roof extension 137 and side floor extension 133. Tent wall 113 is also similarly configured between front roof extension 106 and front floor extension 122. Front floor extension 122 may be braced against trailer chassis 120 with brace 116. Other floor extensions may also be braced. Side floor extensions 138 and 132 may be braced against lower side walls 110 using braces 130 (FIG. 1C). In some embodiments, braces 130 brace against chassis 120 or the ground. Rear floor extension 124 may be braced against the ground. Chassis 120 may include leveling and weight balance equipment for erecting toy-hauling tent trailer 100.

In embodiment 100, tent walls 126, 112, 134, 135, 136, and 113 may be made of tent fabric. For example, canvas, cotton duck, nylon, or polyethylene may be used, as well as any of the modern specialized tent fabrics. In an alternate embodiment, tent walls 126, 112, 134, 135, 136, and 113 may be made of articulated accordion-style panels.

FIG. 1C shows a rear elevation view of toy-hauling tent trailer 100. Vent 104 and drain 140 are open to toy space 211 (FIG. 4A) in both the erected and stowed positions of tent 160. Side floor extensions 138 and 132 are flexibly connected to the tops of rigid lower sidewalls 110. In some embodiments, there are no lower sidewalls 110 and side floor extensions 138 and 132 are flexibly connected to chassis 120. In a particular embodiment, side floor extensions 138 and 132, with lockable articulated panels, may be erected at a level lower than chassis 120.

Figure 2A:
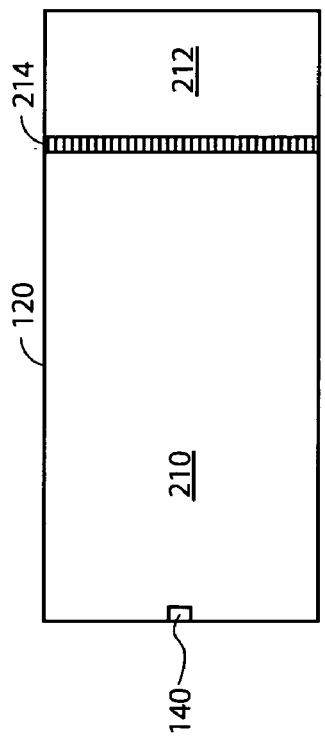
FIG. 2A is a top plan view of the interior floor of the equipment-hauling expandable shelter of FIGS. 1A–C.

FIG. 2A shows a plan view of center floor section 210 and 212. Floor section 210 of toy space 211 may be separated from floor section 212 of the clean cargo space by partition 214. Exemplary drain 140 may be used to discharge water, mud, and other materials that drip from toys after use. It may also be used when washing out the toy space with a hose. In some embodiments, drain 140 extends entirely across the rear end of toy-hauling tent trailer 100. In a particular embodiment, drain 140 may be a plurality of individual drains.

FIG. 2B shows a side elevation view of toy-hauling tent trailer 100 in the stowed position of tent 160. Rear floor extension 124, or ramp 124, is shown folded up to its stowed position. Rear roof extension 108 is shown folded down to form the rear wall of toy-hauling tent trailer 100 in the stowed position of tent 160. Tent walls 126 and 112 may be stowed between and still attached to rear floor extension 124 and rear roof extension 108. The rear of toy-hauling tent trailer 100 may be opened in the stowed position to load or launch a toy. Side roof extensions 109 and 137 are shown folded down to form a top portion of the sidewall of toy-hauling tent trailer 100 in the stowed position of tent 160. Door extension 115 (FIG. 1B) has been stowed within or behind door 114. Front floor extension 122 has been folded up and front roof extension 106 folded down over it to form the front wall of toy-hauling tent trailer 100 in the stowed position of tent 160. In the stowed position of tent 160, toy-hauling tent trailer 100 is short enough, usually no more than six or seven feet high, to comply with zoning ordinances regarding stored vehicles.

Figure 2C:
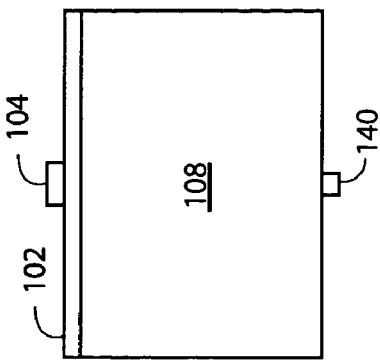
FIG. 2C is a rear view of the equipment-hauling expandable shelter of FIGS. 1A–C in the stowed position of the shelter.

FIG. 2C is a rear elevation view of tent 160 in the stowed position. Center roof section 102 is the roof of toy-hauling tent trailer 100 in the stowed position of tent 160. Vent 104 and drain 140 are operable during stowage to prevent fuel fumes from accumulating in toy space 211 above floor 210 (FIG. 4A).

Although the invention may be readily adapted to a variety of embodiments of an equipment-hauling expandable shelter, with reference to FIG. 3, toy-hauling tent trailer 300 is an example of an equipment-hauling expandable shelter of the invention. FIG. 3 shows toy 301 (a jet ski) being loaded into toy-hauling tent trailer 300 in the erected position of tent 160. As shown, toy 301 is being loaded by rolling toy 301 up ramp 124 on the toy's custom trailer. Within toy-hauling tent trailer 300, the toy's separate trailer may be attached to tie-down strips 502 (FIG. 5), the trailer then serving as a holding fixture for toy 301. In many embodiments, toy 301 may be loaded without its own trailer. Many toys 301 have their own wheels. In a particular embodiment, a jet ski may be launched from toy-hauling tent trailer 300 directly into the water by backing the trailer down the loading ramp at a dock facility until ramp 124 may be lowered to be partially in the water. The jet ski may then be slid out of toy-hauling tent trailer 300 and into the water. In some embodiments, ramp 124 or floor 210 may comprise holding fixtures such as boat bunk glide-ons or bunk pads. In variations of these embodiments, the boat bunk glide-ons and bunk pads may be configured to be attachable to tie-down strips 502 (FIG. 5). In other embodiments, other holding fixtures adapted to a particular toy or type of toy may be integral to the floor 210 or ramp 124 or may be attachable to tie-down strips 502.

Although the invention may be readily adapted to a variety of embodiments of an equipment-hauling expandable shelter, with reference to FIGS. 4A–4B, toy-hauling tent trailer 400 is an example of an equipment-hauling expandable shelter of the invention. FIG. 4A shows a cross-sectional view through toy space 211 of toy-hauling tent trailer 400 in the stowed position of tent 160. Side roof extension 404 may be stowed on the outside of toy-hauling tent trailer 400 to form an upper portion of the outer side of toy-hauling tent trailer 400. Side floor extension 408 may be stowed inside toy-hauling tent trailer 400, placed to allow room for tent wall 406 to be stowed between roof extension 404 and floor extension 408. Brace 410 may be folded against floor extension 408 in the stowed position of tent 160. The space above floor 210 and below center roof section 102 is toy space 211.

In some embodiments, roof extension panel 404 may overlap a portion of lower sidewall 110. In such an embodiment, posts 150 (FIG. 1B) or modular wall units 420 may be extended to raise center roof section 102 without unfolding the modular wall units 420. As center roof section 102 is raised, roof extension panel 404 moves vertically upward, keeping tent wall 406 contained between roof extension panel 404 and floor extension panel 408. In such a configuration, taller cargo may be carried inside toy-hauling tent trailer 400.

FIG. 4B shows a cross-sectional view of toy-hauling tent trailer 400 in the erected position of tent 160. Roof extensions 404 may pivoted up to their erected positions and floor extensions 408 may be pivoted down to their erected positions, thereby extending tent walls 406. Note that raising center roof section 102 by extending posts 150 (FIG. 1B) will necessarily accomplish some of this pivoting. Braces 410 are shown braced against chassis 120, though they could be braced against the ground.

In some embodiments, each set of roof extension 404, connected tent wall 406, and floor extension 408 may be formed as a modular folding wall unit 420. The modular folding wall unit 420 may be prefabricated for installation on a variety of lower side walls 110 or chassis 120. Modular folding wall unit 420 may incorporate the function of extendable posts 150 (FIG. 1B) in a frame for modular folding wall unit 420. The frame may further provide flexible attachments to roof extension 404 and floor extension 408. Thus, the walls and ends of toy-hauling tent trailer 400 could be fabricated as appropriately adapted modular folding wall units 420, attached at the edges which meet at the corners of chassis 120. Center roof section 102 could then be attached to the plurality of modular folding wall units 420 and center roof section 120 would be raised simultaneously when modular folding wall units 420 were erected.

Figure 5A:
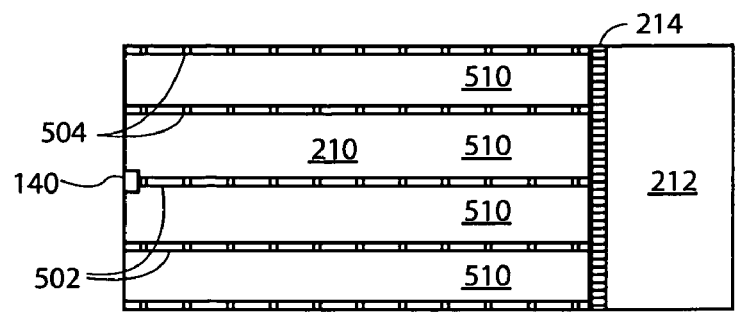
FIG. 5A is a top plan view of the floor space of yet another embodiment of an equipment-hauling expandable shelter showing an exemplary configuration of a grid of tie-down strips.
Figure 5B:
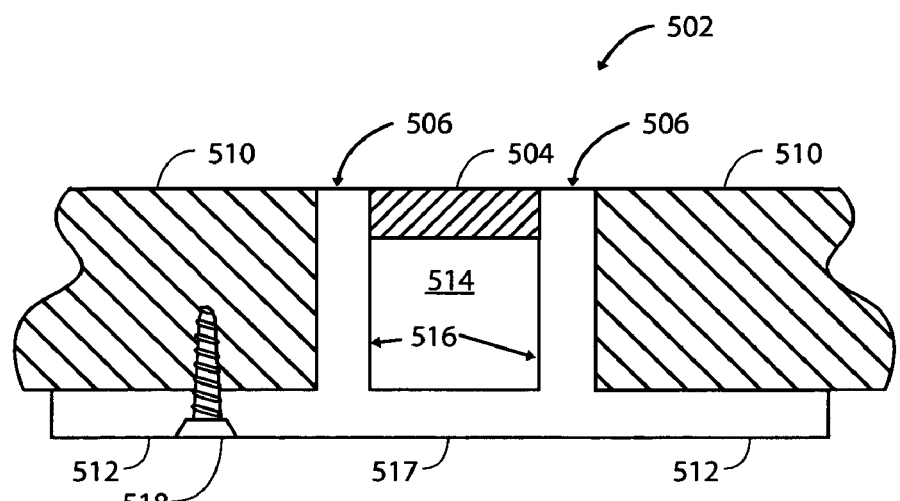
FIG. 5B is a transverse cross sectional view of an example of a tie-down strip for the equipment-hauling expandable shelter of FIG. 5A.
Figure 5C:
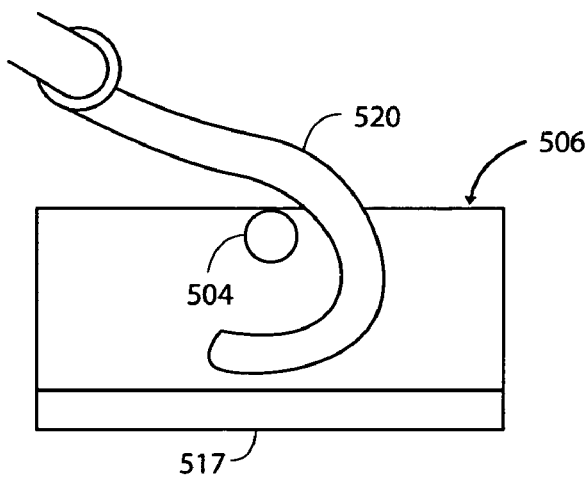
FIG. 5C is a longitudinal cross sectional view of an example of a portion of a tie-down strip for the equipment-hauling expandable shelter of FIG. 5A.

Although the invention may be readily adapted to a variety of embodiments of an equipment-hauling expandable shelter, with reference to FIGS. 5A–5C, another example of an equipment-hauling expandable shelter of the invention is depicted. FIG. 5A shows an exemplary embodiment of floor 210 comprising an exemplary grid of tie-down strips 502 and flooring panels 510. Tie-down strips 502 provide points of attachment for tie-down strap hooks 520 (FIG. 5C) which may be used to prevent toy 301 (FIG. 3) from moving around in toy space 211 when toy-hauling tent trailer 100 is being towed. Tie-down strips 520 additionally serve as floor joists for center floor section 210, supporting flooring panels 510 and supported by attachment to chassis 120 (FIG. 1B). Each tie-down strip 502 may comprise a plurality of tie-down bars 504. In a particular embodiment, tie-down strips 502 may be oriented transversely, rather than longitudinally, as shown. In various alternate embodiments, tie-down strips 502 may be shaped, may interconnect, and may be of various sizes.

FIG. 5B shows a cross-sectional elevation view of tie-down strip 502. Tie-down strip 502 may comprise a channel 514 bounded by inner wall surfaces 516 and base 517. Tie-down bars 504 are attached within channel 514 and fixed to inner wall surfaces 516. Flanges 512 extend from base 517 to support flooring panels 510. Flooring panels 510 may be attached to flanges 512. For example, a plurality of screws 518 may attach flooring panel 510 to flange 512. Other conventional methods of attachment are also contemplated.

Channel 514 and flanges 512 are sized and shaped to put top surfaces 506 of the channel walls flush with the top surfaces of flooring panels 510. In a particular embodiment, top surfaces 506 may be finished or coated to create high-friction surfaces. In some embodiments, tie-down bar 504 may be below the top of channel 514. Flanges 512 and/or base 517 may be adapted to be attached to chassis 120 and to serve as floor joists. For example, attachment flanges 512 for bolting or welding, adapted to a particular chassis 120, may extend from base 517. In an alternate embodiment, the channel 514 does not have a constant depth, but slopes downward to drain 140 to allow water dripping from toy 301 (FIG. 3) to drain from channel 514. In another alternate embodiment, floor 210 may be slightly sloped to enable channels 514 of constant depth to drain floor 210.

FIG. 5C shows a cross section view through the longitudinal center line of tie-down strip 502. Channel 514 may be sized to enable tie-down hook 520 to engage tie down bar 504.

Figure 6A:
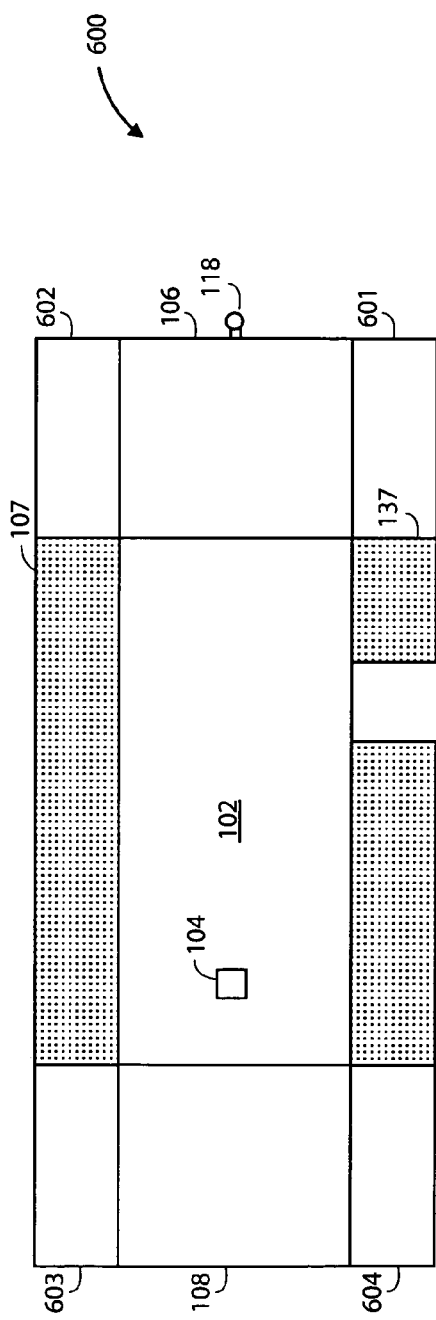
FIGS. 6A–C are top, side, and rear views respectively of even another embodiment of an equipment-hauling expandable shelter in the erected position of the shelter.
Figure 6B:
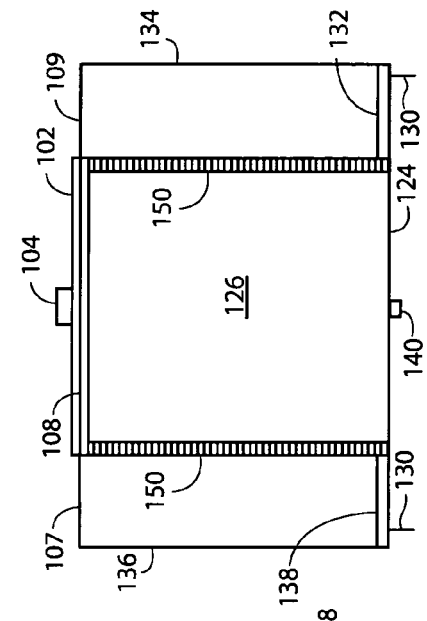
Figure 6C:
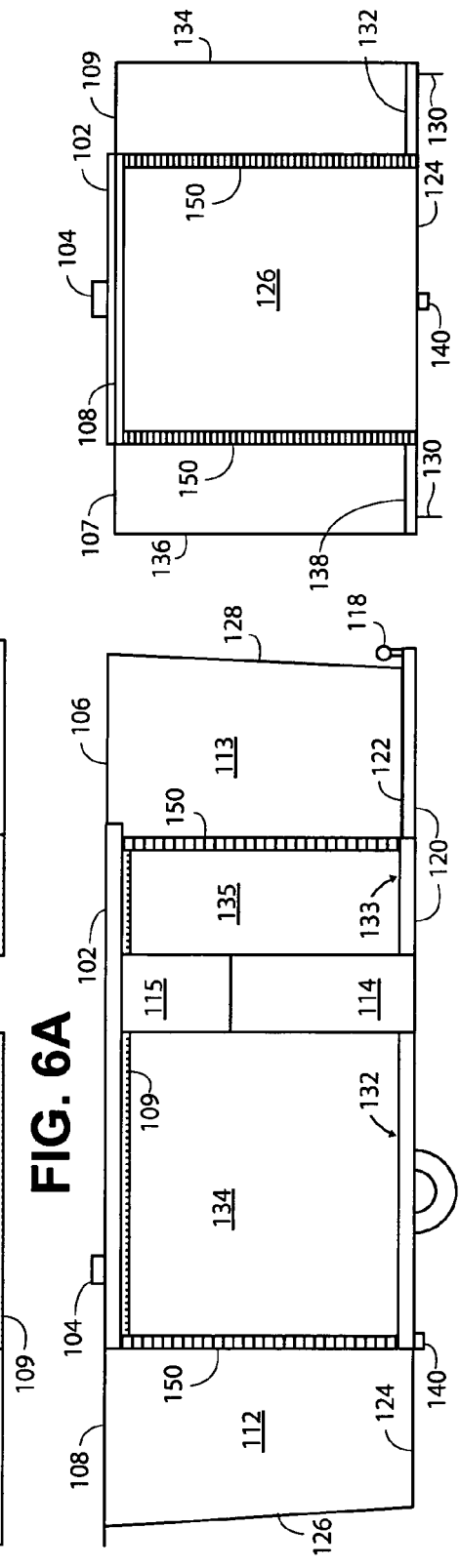

Although the invention may be readily adapted to a variety of embodiments of an equipment-hauling expandable shelter, with reference to FIGS. 6A–6C, toy-hauling tent trailer 600 is an example of an equipment-hauling expandable shelter of the invention. FIG. 6A shows a top plan view of toy-hauling tent trailer 600. Front and rear roof extensions 106 and 108 have side extensions 601, 602 and 603, 604, respectively. These side extensions 601–604 fold out when erected to engage side extension panels 107, 109, and 137 to make a larger roof. Floor extension panels 124 and 122 are similarly configured.

FIG. 6B shows a side elevation view of toy-hauling tent trailer 600. Toy-hauling tent trailer 600 lacks lower sidewalls 110 (FIG. 2B). Floor extensions 124, 132, 133, 122, and 138 attach to chassis 120. Tent walls, 112, 113, 134, 135, 136, 126, and 128 extend downward from roof extensions 106 and 108 to engage their respective floor extension panels 122 and 124.

With reference to FIGS. 7–16, equipment-hauling expandable shelter 700 is another example of an equipment-hauling expandable shelter of the invention. The principal differences between equipment-hauling expandable shelter 700 and those embodiments discussed previously are lift assembly 740, drop assembly 770, and drop assembly 790.

Turning to FIGS. 7–12 and 17 and describing equipment-hauling expandable shelter 700 and lift assembly 740 in greater detail, equipment-hauling expandable shelter 700 may include trailer chassis 720 and solid/sealed wheel fenders 722. Supported above trailer chassis 720 by four extendable corner posts 760 may be center roof section 702 with front roof extension 706 and rear roof extension 708 attached thereto. Also included may be rear floor extension 724, side floor extensions 726, bed extensions 730, and utility panel 732 which includes shower, kitchen, water, electric, gas, and the like fixtures and related components (e.g., piping, wiring, and the like).

Coupling together four extendable corner posts 760 and front roof extension 706 and rear roof extension 708 are four lift assemblies 740 for raising center roof section 702. Each lift assembly 740 may comprise lower arm 742, upper arm 744, a tension spring in either lower arm 742 or upper arm 744, roof extension arm 746, slot 748, two bracket pins 750, boot 752, upper and lower post brackets 754, and slot pin 756. The distal end of each lower arm 742 is pivotally coupled to a corresponding post 760. The distal end of each upper arm 744 is pivotally coupled to the extendable portion of the corresponding post 760. Bracket pins 750 and upper and lower post brackets 754 may accomplish these pivotal couplings. The proximal ends of each lower arm 742 and each upper arm 744 are pivotally coupled together and surrounded by safety boot 752. Each tension spring provides easy lift assembly operation, and therefore easy raising of center roof section 702. Each distal end of each roof extension arm 746 is coupled to its corresponding front roof extension 706 or rear roof extension 708, while each proximal end of each roof extension arm 746 is slidably coupled through its slot 748 to its corresponding slot pin 756 in either lower arm 742 or upper arm 744.

Figure 7:
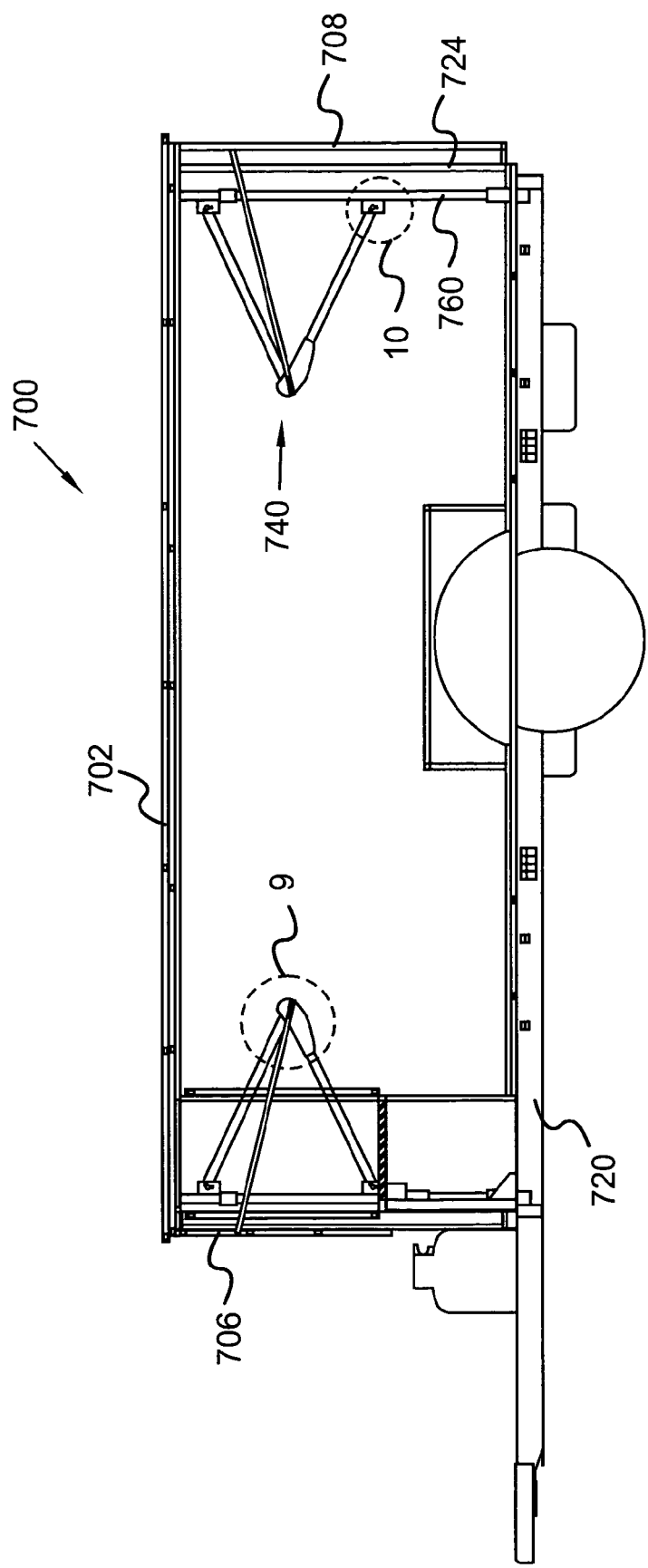
FIG. 7 is a side view of a another equipment-hauling expandable shelter configured according to an embodiment of the present invention in the stowed position of the shelter.
Figure 8:
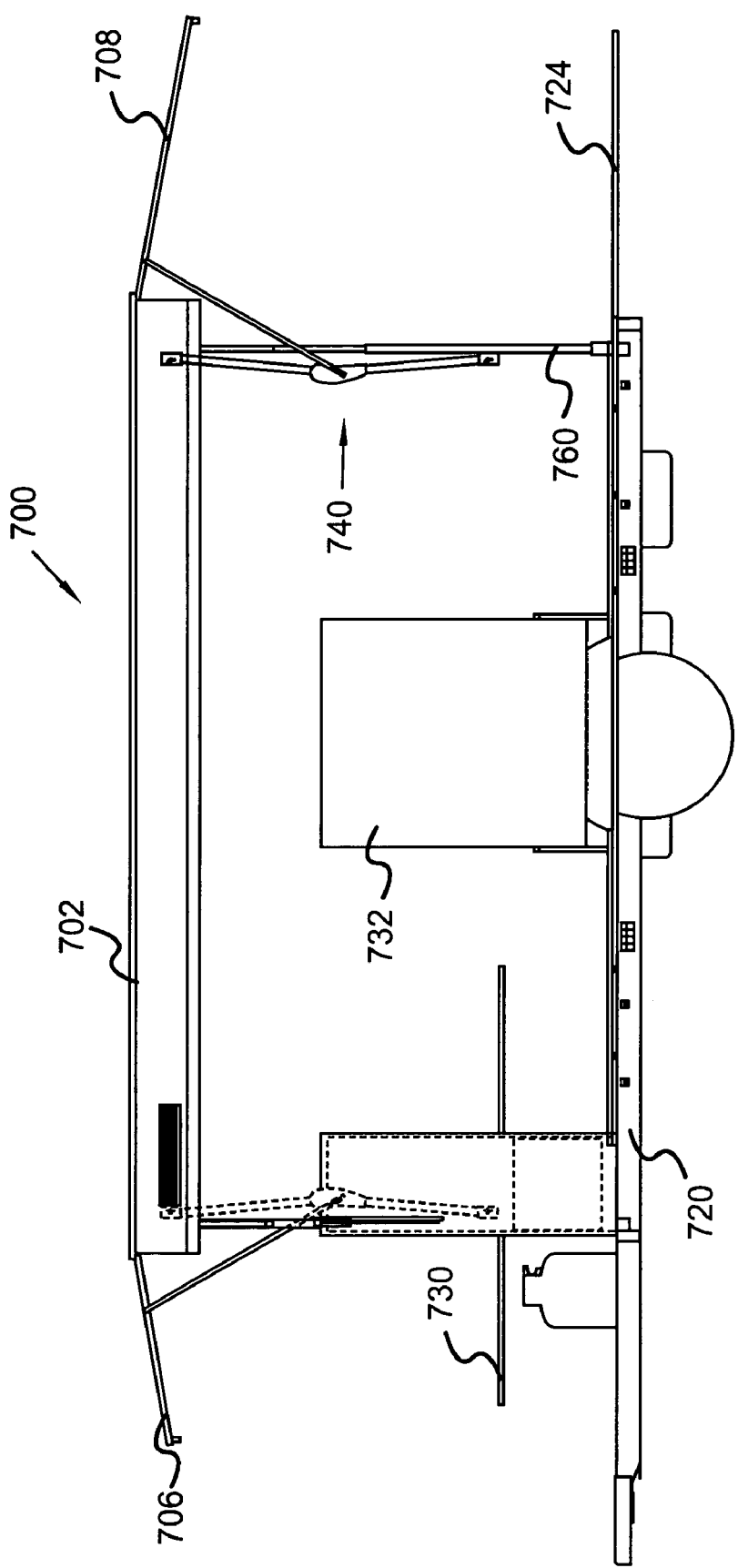
FIG. 8 is a side view of the equipment-hauling expandable shelter of FIG. 7 in the erected position of the shelter.
Figure 10:
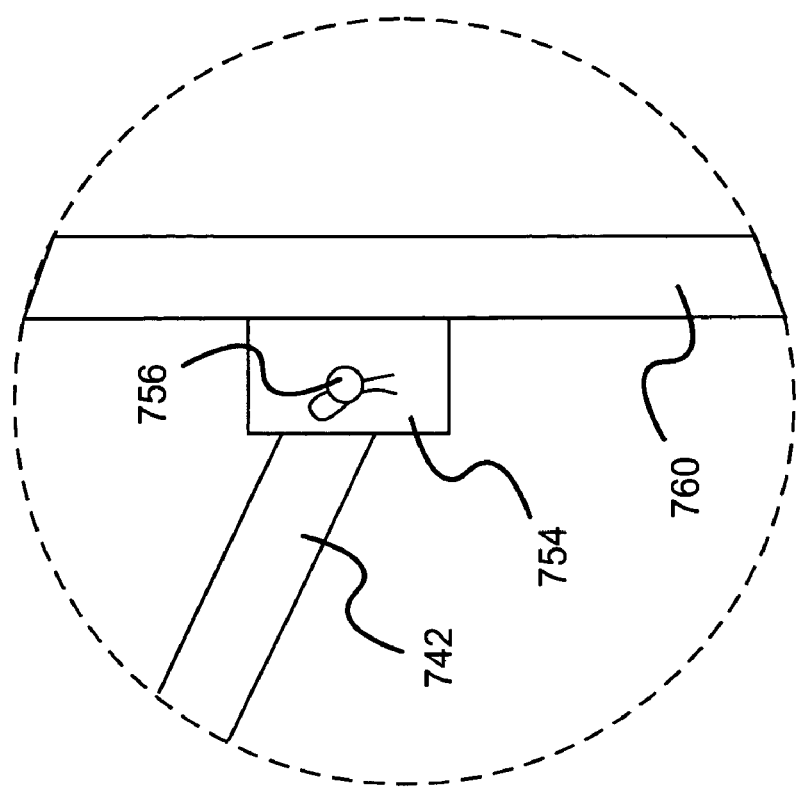
FIG. 10 is a portion of a view of the equipment-hauling expandable shelter of FIG. 7 enlarged for magnification purposes.
Figure 9:
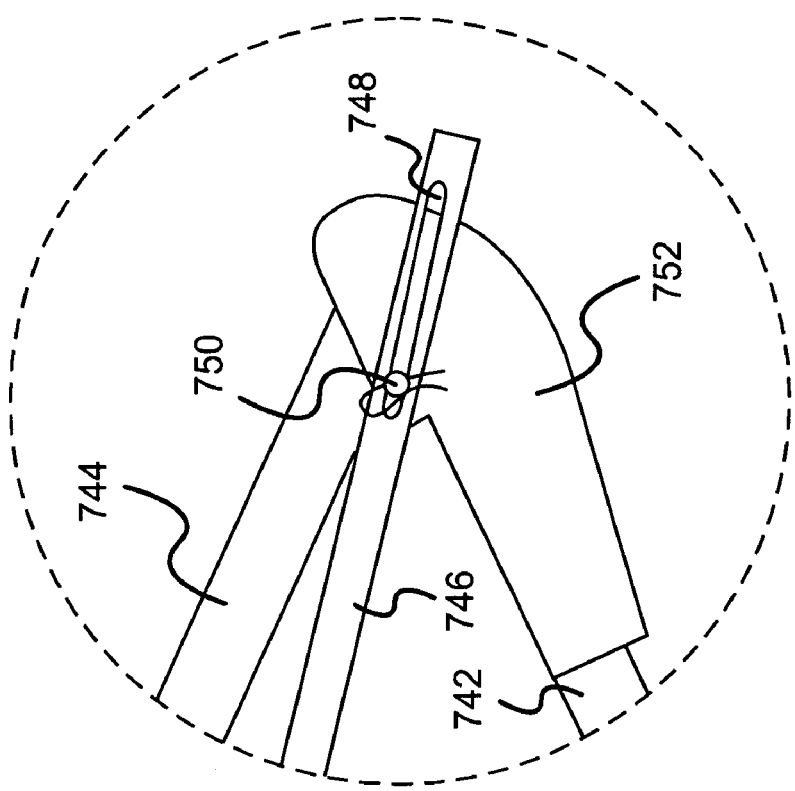
FIG. 9 is a portion of a view of the equipment-hauling expandable shelter of FIG. 7 enlarged for magnification purposes.
Figure 11:
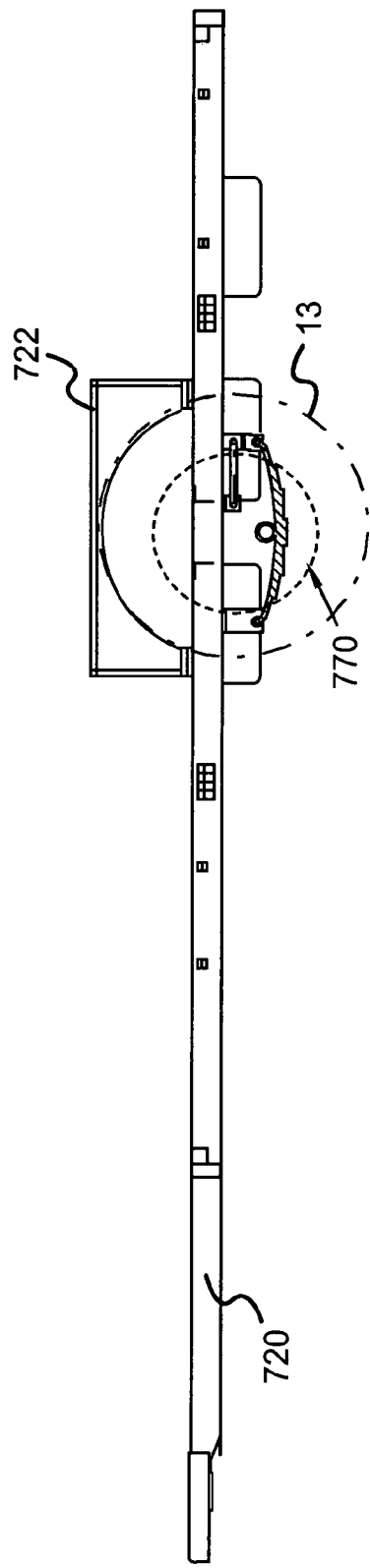
FIG. 11 is a side view of an embodiment of a drop assembly of the equipment-hauling expandable shelter of FIG. 7 in the stowed position of a wheel.
Figure 12:
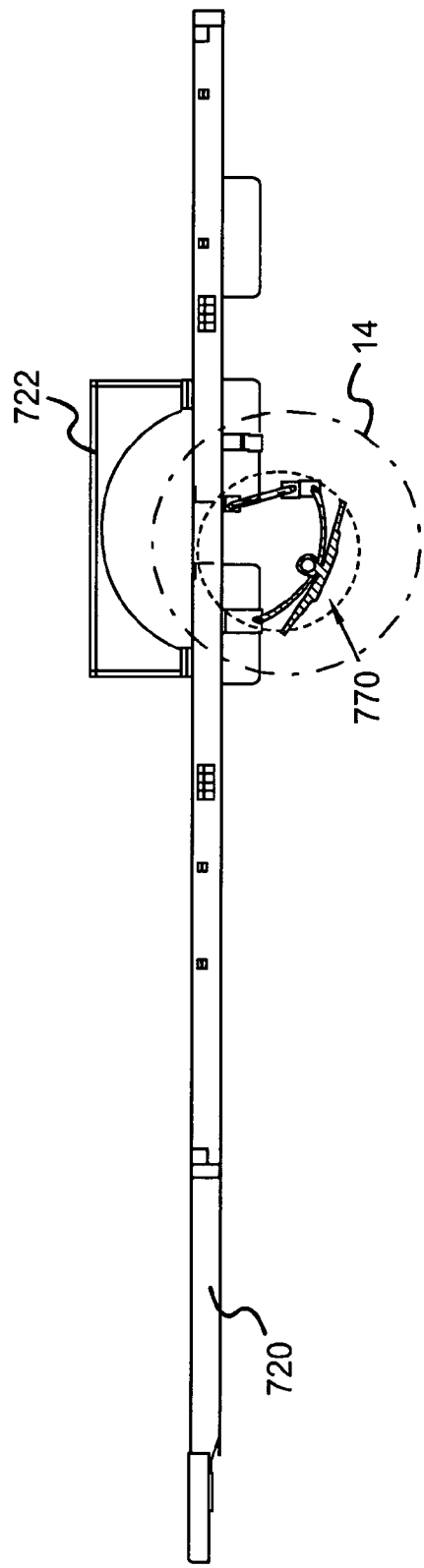
FIG. 12 is a side view of the drop assembly of FIG. 11 in the lowered position of the wheel.
Figure 13:
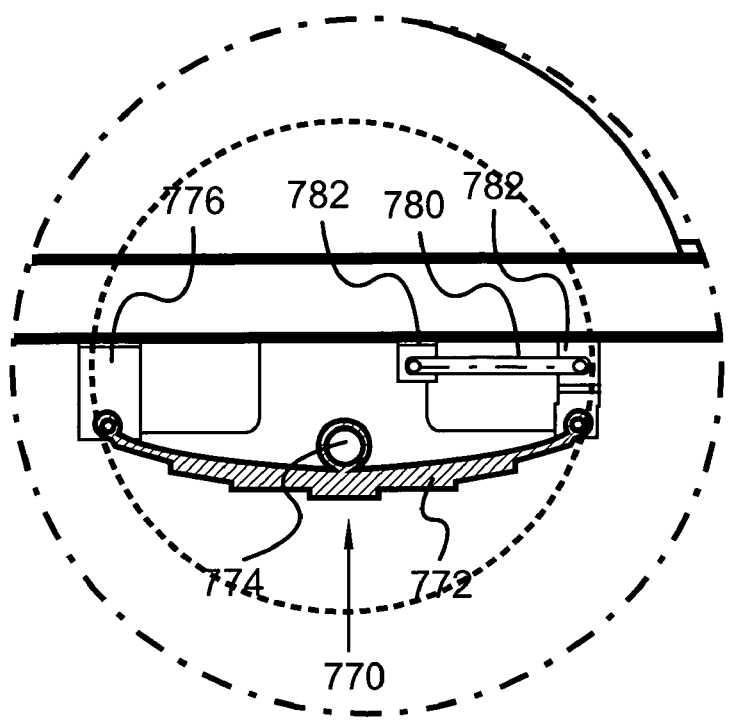
FIG. 13 is a portion of a view of the equipment-hauling expandable shelter of FIG. 11 enlarged for magnification purposes.
Figure 14:
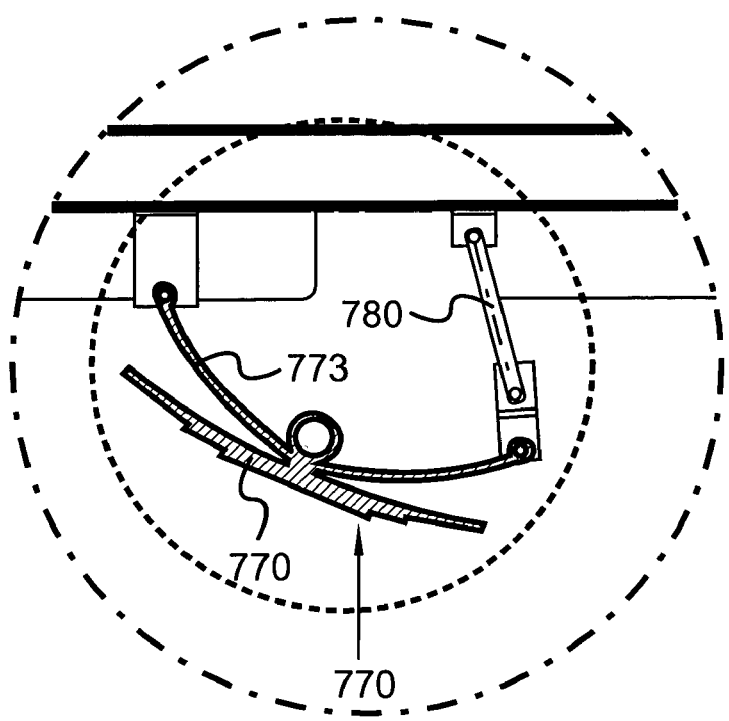
FIG. 14 is a portion of a view of the equipment-hauling expandable shelter of FIG. 12 enlarged for magnification purposes.
Figure 15:
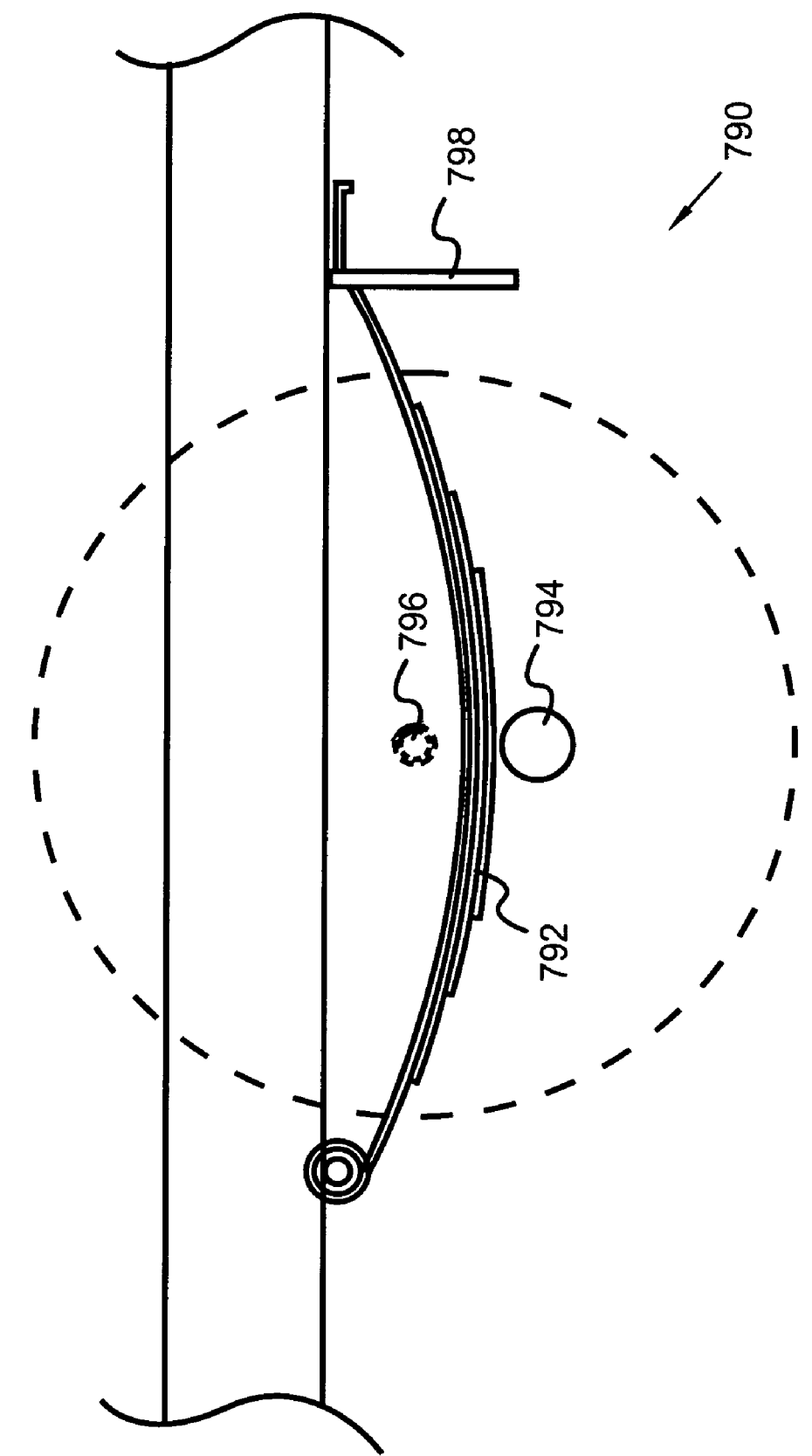
FIG. 15 is a side view of another embodiment of a drop assembly of the equipment-hauling expandable shelter of FIG. 7 in the stowed position of a wheel.
Figure 16:
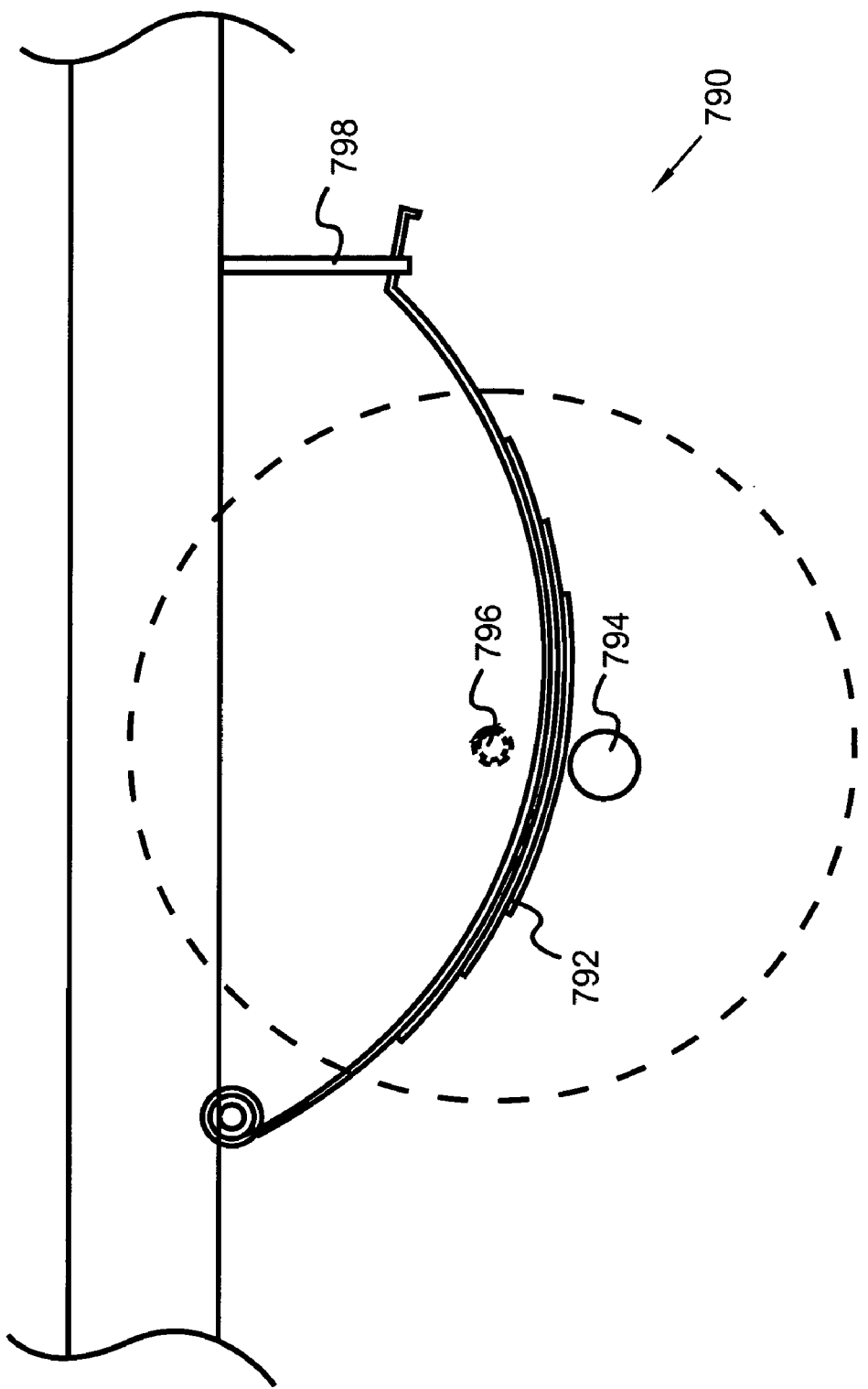
FIG. 16 is a side view of the drop assembly of FIG. 15 in the stowed position of the wheel.
Figure 17:
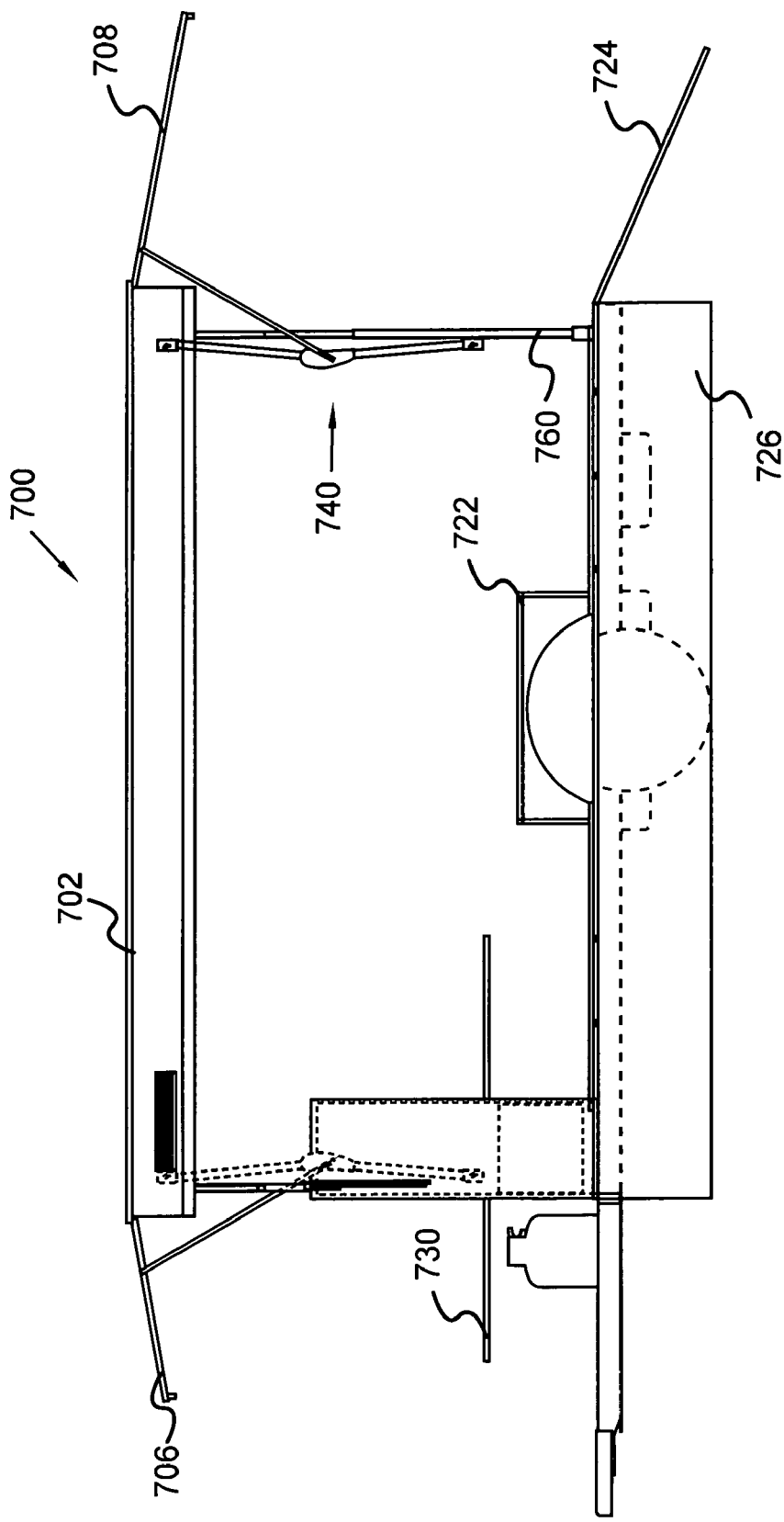
FIG. 17 is a side view of the equipment-hauling expandable shelter of FIG. 7 in the erected position of the shelter.

For the exemplary purposes of this disclosure, equipment-hauling expandable shelter 700 may be erected as depicted in FIGS. 7–8. First, front roof extension 706 and rear roof extension 708 may be lifted up by two operators simultaneously or by a single operator alternatingly and incrementally. As front roof extension 706 and rear roof extension 708 are lifted up, each slot 748 of each roof extension arm 746 simultaneously slidably engages its corresponding slot pin 756, thereby expanding or spreading apart each lower arm 742 and each upper arm 744. The extension of each lower arm 742 and each upper arm 744 simultaneously raises the extendable portion of each corner post 760, which in turn raises center roof section 702. Thereafter, if desired, rear floor extension 724 may be lowered, as well as bed panels 730. Moreover, equipment-hauling expandable shelter 700 may be easily stowed by reversing the foregoing erection steps.

While the erection and stowing of equipment-hauling expandable shelter 700 has been described with reference to the drawing figures in a particular sequence of steps and with specific component configurations, it will be understood by those of ordinary skill in the art that the erection and stowing of equipment-hauling expandable shelter 700 is not limited to the specific order of steps and component configurations as disclosed. Any steps and sequence of steps of and component configurations for the erection and stowing of any equipment-hauling expandable shelter embodiment of the invention indicated herein are given as examples and not as limitations, since various erection and stowing processes, sequences of steps, and component configurations may be used to erect and stow an equipment-hauling expandable shelter. For example, lift assemblies 740 or any other lift mechanism, such as a cable system, hydraulic dampers, a cable system with a torsion spring or springs, a jack screw or screws, and the like, may be used in conjunction with side roof extensions or both side roof extensions and front and rear roof extensions 706 and 708 respectively to automatically raise center roof section 702 in any of the manners as described above.

Referring to FIGS. 11–14 and describing equipment-hauling expandable shelter 700 and drop assembly 770 in greater detail, drop assembly 770 is configured to allow wheels of trailer chassis 720 to be changed. Drop assembly 770 may include spring stack 772 with free top spring 773, drop axel 774, fixed shackle mount 776, goofy shackle 780, fixed goofy shackle mount 782, and free goofy shackle mount 784. In order to obtain sufficient axel drop for wheel removal, free top spring 773 of leaf spring stack 772 may have a very low spring rate so as to droop under the weight of drop axle 774, while the other springs in stack 772 support the loaded weight. The springs in stack 772 are not connected together except in the center with u-bolts. Drop axel 774 allows the floor to be lower.

For the exemplary purposes of this disclosure, a wheel on equipment-hauling expandable shelter 700 may be lowered for removal as depicted in FIGS. 11–14. First, corner stabilizing jacks with sufficient travel to lift wheels off the ground, or some other trailer lift/stabilizing system, are employed to raise one side of trailer chassis 720. Simultaneously, under the weight of drop axel 774, goofy shackle 776 allows leaf spring stack 772 to lower, thereby lowering the wheel so it can be removed. A replacement wheel of equipment-hauling expandable shelter 700 may then be easily installed and stowed by reversing the foregoing lowering steps.

While the lowering and stowing of a wheel of equipment-hauling expandable shelter 700 has been described with reference to the drawing figures in a particular sequence of steps and with specific component configurations, it will be understood by those of ordinary skill in the art that the lowering and stowing of a wheel of equipment-hauling expandable shelter 700 is not limited to the specific order of steps and component configurations as disclosed. Any steps and sequence of steps of and component configurations for the lowering and stowing of a wheel of any equipment-hauling expandable shelter embodiment of the invention indicated herein are given as examples and not as limitations, since various lowering and stowing processes, sequences of steps, and component configurations may be used to lower and stow a wheel of an equipment-hauling expandable shelter. For example, the drop axel may be a torsion drop axel eliminating the need for leaf spring stacks 772 and goofy shackles 780, or, turning to FIGS. 15–16, an alternative drop assembly 790 may be utilized for allowing wheels of trailer chassis 720 to be changed.

Drop assembly 790 may include spring stack 792, drop axel 794, spindle 96, and spring restraint 98. The principal differences between drop assembly 790 and drop assembly 770 discussed previously are spring stack 92 and spring restraint 98. Spring stack 792 has a pivotally fixed distal end and a free proximal end that slides up and down within U-shaped spring restraint 798, while trailer chassis 720 is raised or lowered by a trailer lift/stabilizing system as explained above, removably abutting the trailer chassis and the base of spring restraint 798.

It will be understood by those of ordinary skill in the art that the invention is not limited to the specific components of equipment-hauling expandable shelters disclosed herein, as virtually any components consistent with the intended operation of an equipment-hauling expandable shelter of the invention may be utilized. Accordingly, for example, although particular components are disclosed, such components may comprise any shape, size, style, type, model, version, measurement, material, quantity, and/or the like as is known in the art for such components consistent with the intended operation of an equipment-hauling expandable shelter of the invention. It will also be understood by those of ordinary skill in the art that the invention is not limited to use of any specific components, provided that the components selected are consistent with the intended operation of an equipment-hauling expandable shelter of the invention.

The components defining any equipment-hauling expandable shelter embodiment of the invention may be formed of any of many different types of materials or combinations thereof that can readily be formed into shaped objects provided that the components selected are consistent with the intended mechanical operation of an equipment-hauling expandable shelter of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, nylon, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The components defining any equipment-hauling expandable shelter embodiment of the invention may be purchased pre-manufactured or manufactured separately and then assembled together. However, some of the components may be manufactured simultaneously and integrally joined with one another. Manufacture of these components separately or simultaneously may involve extrusion, pultrusion, vacuum forming, injection molding, blow molding, resin transfer molding, casting, milling, stamping, cutting, welding, soldering, riveting, punching, and/or the like. If any of the components are manufactured separately, they may then be coupled with one another in any manner known in the art, such as with adhesive (e.g. ?), a weld, a fastener (e.g. a bolt, a screw, a nail, a rivet, a pin, and the like), wiring, a stitch, any combination thereof, and/or the like for example, depending on, among other considerations, the particular material forming the components. Other possible steps might include sand blasting, polishing, powder coating, and/or painting the components for example.

The invention is particularly useful in hauling toys and for providing shelter in the form of a tent. However, it will be understood by those of ordinary skill in the art that the invention is not limited to uses relating to tents and hauling toys. Rather, any description relating to toys, tents, and the like is for the exemplary purposes of this disclosure, and those of ordinary skill in the art will also understand that the invention may also be used in a variety of shelter applications with similar results for a variety of equipment, such as containers (e.g., cargo containers) and covers (e.g., cargo bed covers). For example, cargo container and cargo bed cover embodiments may be very similar to other equipment-hauling expandable shelter embodiments previously discussed, such as equipment-hauling expandable shelter 700. However, instead of including trailer chassis 720, fenders 722, bed extensions 730, utility panel 732, and drop assembly 770 for example, cargo container and cargo bed cover embodiments may each include a non-wheeled chassis, and all of the rest of the components of equipment-hauling expandable shelter 700, including extendable posts 760, center roof section 702 with front roof extension 706 and rear roof extension 708 attached thereto, a rear floor extension 724, and four lift assemblies 740 coupling together four extendable posts 760 and front roof extension 706 and rear roof extension 708.

In describing the use and advantages of the present invention further, the following non-limiting example illustrates a comparison between conventional 12' tent trailers and a trailer embodiment of the present invention. Notwithstanding, those of ordinary skill in the art will be able to apply this example to other comparisons from the disclosure provided herein, such as conventional campers to a camper embodiment of the present invention with similar results.

EXAMPLE

| Type | Feature | 12' Trailer Embodiment of the Invention | Conventional 12' Tent Trailers |
|---|---|---|---|
| Usage | Haul toys/cargo | Y | N |
| | Persons able to sleep in | 10 | 8–9 |
| | store toys/cargo | Y | N |
| | Tow behind cars/SUV's | Y | Y |
| | Loading ramps multi side | Y | N |
| | Transport with roof in up position | Y | N |
| | Gross vehicle weight, Lbs | 3800 | 3770 |

-continued

| Type | Feature | 12' Trailer Embodiment of the Invention | Conventional 12' Tent Trailers |
|---|---|---|---|
| | Payload, Lbs | 2000 | 735–825 |
| Living space | One level flat floor, ex. Wheel wells | Y | N |
| | Solid roof while expanded | Y | N |
| | Reconfigurable interior | Y | N |
| | Floor plan expands | 270% | 200% |
| Toy hauler | Storage volume | 344 CU FT | 50 CU FT |
| | Integral tie downs every few inches | Y | N |
| | Haul up to 2 large quads | Y | N |
| | No slip ramp | Y | N |
| | Hose out toy space | Y | N |
| | Frame width similar to toy wheel base | Y | N |
| | Haul with roof in up position | Y | N |
| Exterior | Powder coated steel frame | Y | Y |
| | No slip entry steps | Y | Y |
| | Heavy duty utility tires | Y | N |
| | Stabilizer jacks | Y | Y |
| | 20 lb LP tank | Y | Y |
| | Aluminum frame walls | Y | SOME |
| | 25 amp converter/110 v | Y | Y |
| | Patio light | Y | Y |
| | Water proof floor-hose out | Y | N |
| | Sectionalized tent material | Y | Y |
| | Fresh water storage under floor 20 gal | Y | Y |
| | 12 Volt water pump | Y | Y |
| | All infrastructure under floor | Y | N |
| | Solid and screen door | Y | Y |
| | Battery | Y | Y |
| | Electric brakes | Y | Y |
| | Free standing Canopy | Y | N-FIXED |
| | Spare tire and tools | Y | Y |
| Interior | Stove surround | Y | N |
| | Movable Kitchen counter, solid | Y | N |
| | 2 burner indoor/outdoor stove | Y | Y |
| | Indoor/outdoor sink | Y/Y | Y/N |
| | Free standing dinette | Y | N-FIXED |
| | Three way refrigerator | 2.5 CU FT | 1.9–3 CU FT |
| | Free standing benches (3) | Y | N-FIXED |
| | 2 king size beds | 8" AIR, 77X70 | 4" FOAM |
| | Bench cushions | 4" FOAM | 4" FOAM |
| | Windows | GLASS IN DOOR | VINYL |
| | Interior flooring | ROLL OUT CARPET | SHEET VINYL |
| | Roof vent | Y | Y |
| | Inside access to storage | Y | Y |
| | Clean storage | 28 CU FT | 30–50 CU FT |
| | Insulated walls and screens | Y | Y |
| | Fixed wooden furniture | N | Y |
| | Shower pan | Y - ON RAMP | Y |
| | Shower walls | Y | Y |
| | Porta potty | Y | Y |
| | Water heater | Y | Y |
| Options | Outside shower | Y | Y |
| | Movable Kitchen counter, folding | Y | N |
| | Air compressor and tank under floor | Y | N |
| | Awnings | Y | Y |
| | BBQ grill | Y | NA |
| | Screen room | Y | Y |
| | Privacy curtains | Y | Y |
| | Valance | Y | Y |
| | Cable TV jack | Y | Y |
| | Microwave | Y | Y |
| | Generator | Y | N |
| | Fuel pumping station | Y | N |
| | Gray water tank | Y | Y |
| | Stereo | Y | Y |
| | Extra chairs and tables | Y | Y |
| | Remote automatic setup | Y | Y |
| | Entertainment system | Y | N |
| | Water filtration system | Y | Y |
| | Air conditioning pre wire | Y | Y |
| | Air conditioning | Y | Y |
| | Sand pads | Y | Y |
| | Weight balance indicator system | Y | N |
| | Dual 20 lb propane tanks | Y | Y |
| | Tongue storage box | Y | Y |
| | Storage cabinets w/wheels | Y | N |

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation. Similarly, any steps or sequence of steps of the method of the present invention indicated herein are given as examples of possible steps or sequence of steps and not as limitations. For example, the lower sidewalls 110 may comprise tie-down strips 502. Likewise, a truck chassis may be substituted for a trailer chassis 120

The invention claimed is:

1. An equipment-hauling expandable shelter comprising:
 a chassis comprising a central floor section; and
 an expandable-collapsible shelter coupled to the chassis reversibly movable between a stowed position and expanded position, the expandable-collapsible shelter in the stowed position having a first exterior profile size, the expandable-collapsible shelter in the expanded position having a second exterior profile size larger than the first exterior profile size, and the expandable-collapsible shelter comprising:
 an interior space within the expandable-collapsible shelter comprising:
 a fillable-dischargeable cargo space sized, shaped, and unobstructed for containing portable equipment, the cargo space within both the stowed position and the expanded position of the shelter, the cargo space available and accessible in both the stowed and the expanded positions of the shelter through a plurality of ingress and egress locations about the periphery of the expandable-collapsible shelter, and the cargo space having a first interior volume in the stowed position of the shelter; and a living space defined by the expanded position of the shelter, the living space shared and in communication with the cargo space, and the shared living and cargo spaces in the expanded position of the shelter having a second interior volume larger than the first interior volume in the stowed position of the shelter by increasing usable floor area in combination with increasing interior height.

2. The equipment-hauling expandable shelter of claim 1, wherein the chassis comprises at least one of a trailer chassis and a truck chassis.

3. The equipment-hauling expandable shelter of claim 1, wherein the second interior volume is about three times or more larger than the first interior volume.

4. The equipment-hauling expandable shelter of claim 1, wherein the second interior volume is large enough to allow a person to stand upright therein.

5. The equipment-hauling expandable shelter of claim 1, wherein the first interior volume comprises a cuboidal volume.

6. The equipment-hauling expandable shelter of claim 1 further comprising at least one flush tie-down channel in the central floor section, the at least one flush tie-down channel comprising:
a base;
opposing sides extending upward from the base forming a channel depth and a channel width; and
a plurality of spaced apart tie-down bars coupled between the opposing sides, each tie-down bar sized and shaped to allow a tie-down hook to removably engage therewith.

7. The equipment-hauling expandable shelter of claim 6, wherein the at least one tie-down channel comprises a plurality of mutually spaced-apart tie-down channels.

8. The equipment-hauling expandable shelter of claim 6, wherein the at least one tie-down strip comprises a uniformly increasing depth towards an open end of the channel, operative to drain spilled fluids.

9. The equipment-hauling expandable shelter of claim 1, wherein the expandable-collapsible shelter comprises at least one of a tent, a container, and a cover.

10. An equipment-hauling expandable shelter comprising:
a chassis comprising a central floor section;
an expandable-collapsible shelter coupled to the chassis reversibly movable between a stowed position and an expanded position;
a roof comprising:
a substantially rigid, raisable-lowerable central roof section; and
a plurality of substantially rigid roof extensions pivotably coupled to the central roof section, the roof extensions forming portions of shelter sidewalls when the shelter is in the stowed position, and the roof extensions forming additional roof sections when the shelter is in the expanded position;
at least one extendable post coupled to the chassis and supporting the central roof section, the post adjustable to raise and lower the central roof section; and
rear end and at least one side substantially rigid floor extensions pivotably coupled to the central floor section, the at least one side floor extension outside of and at least spanning a wheel fender, the floor extensions forming one of portions of shelter sidewalls and cargo ramps for aft and side loading and unloading equipment when the shelter is in the stowed position, and the floor extensions forming one of additional floor sections level with the central floor section and cargo ramps for aft and side loading and unloading equipment when the shelter is in the expanded position.

11. The equipment-hauling expandable shelter of claim 10, the expandable-collapsible shelter further comprising, in cooperation with the at least one extendable post, one of a cable system, a cable system with at least one torsion spring, hydraulic dampers, and at least one jack screw.

12. The equipment-hauling expandable shelter of claim 10, the expandable-collapsible shelter further comprising at least one lift assembly coupling together the at least one extendable post and at least one roof extension, each lift assembly comprising:
a lower arm comprising a distal end and a proximal end, the distal end pivotally coupled to a non-extendable portion of the at least one extendable post;
an upper arm comprising a distal end and a proximal end, the distal end pivotally coupled to an extendable portion of the at least one extendable post, wherein the proximal ends of the upper arm and the lower arm are pivotally coupled together;
a tension spring in either the lower arm or the upper arm;
a slot pin in either the lower arm or the upper arm; and
a roof extension arm comprising a distal end and a proximal end having a slot therein, the distal end coupled to the at least one roof extension, and the slot of the proximal end slidably coupled to the slot pin;
wherein as the at least one roof extension is lifted or lowered, the slot simultaneously slidably engages the slot pin, thereby simultaneously expanding or contracting the upper and lower arms, thereby simultaneously raising or lowering the extendable portion of the at least one extendable post, and thereby simultaneously raising or lowering the center roof section.

13. The equipment-hauling expandable shelter of claim 12, wherein the at least one lift assembly comprises four lift assemblies, wherein the at least one extendable post comprises four extendable corner posts, and wherein the at least one roof extension comprises a front end roof extension and an opposing rear end roof extension.

14. The equipment-hauling expandable shelter of claim 10, the expandable-collapsible shelter further comprising a plurality of wall sections detachably coupled to free edges of corresponding roof and floor extensions, the wall sections stowed between corresponding roof and floor extensions when the shelter is in the stowed position, and the wall sections forming shelter sidewalls when the shelter is in the expanded position.

15. The equipment-hauling expandable shelter of claim 14, wherein the plurality of wall sections, the plurality of roof extensions, and the plurality of floor extensions comprise a plurality of modular folding wall units.

16. The equipment-hauling expandable shelter of claim 14, wherein the wall sections comprise one of substantially flexible wall sections, substantially rigid wall sections, and combinations thereof.

17. The equipment-hauling expandable shelter of claim 16, wherein the substantially rigid wall sections comprise articulated sections operable to unfold to a size greater than their stowed dimensions.

* * * * *